United States Patent Office 2,776,865
Patented Jan. 8, 1957

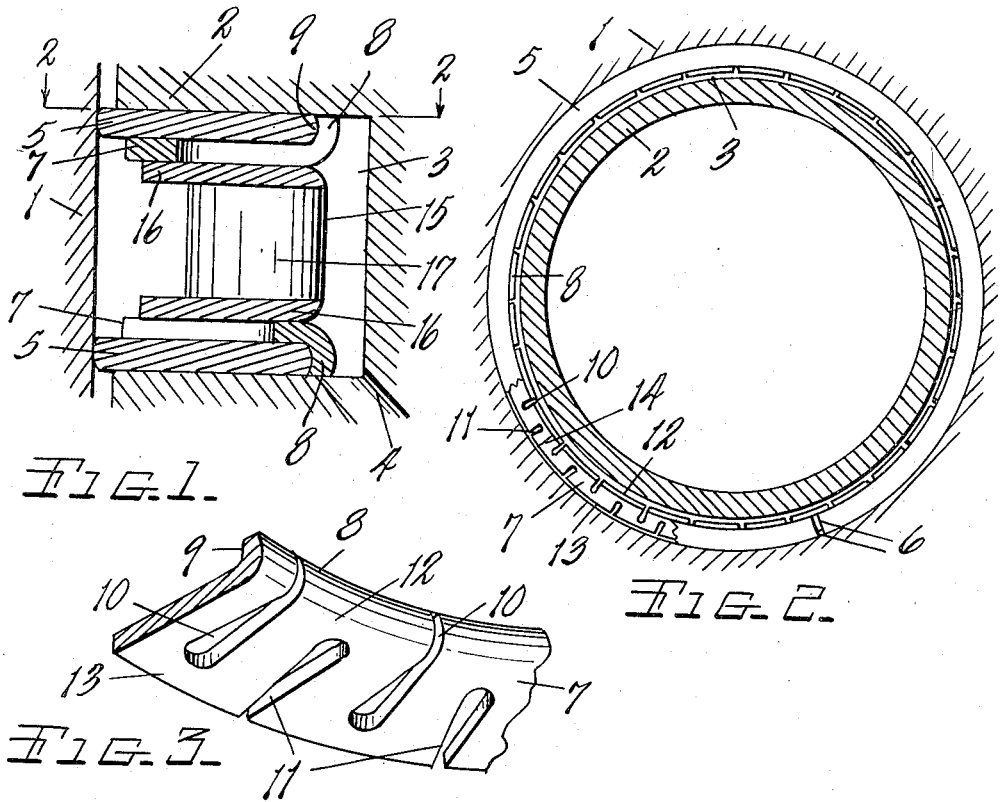
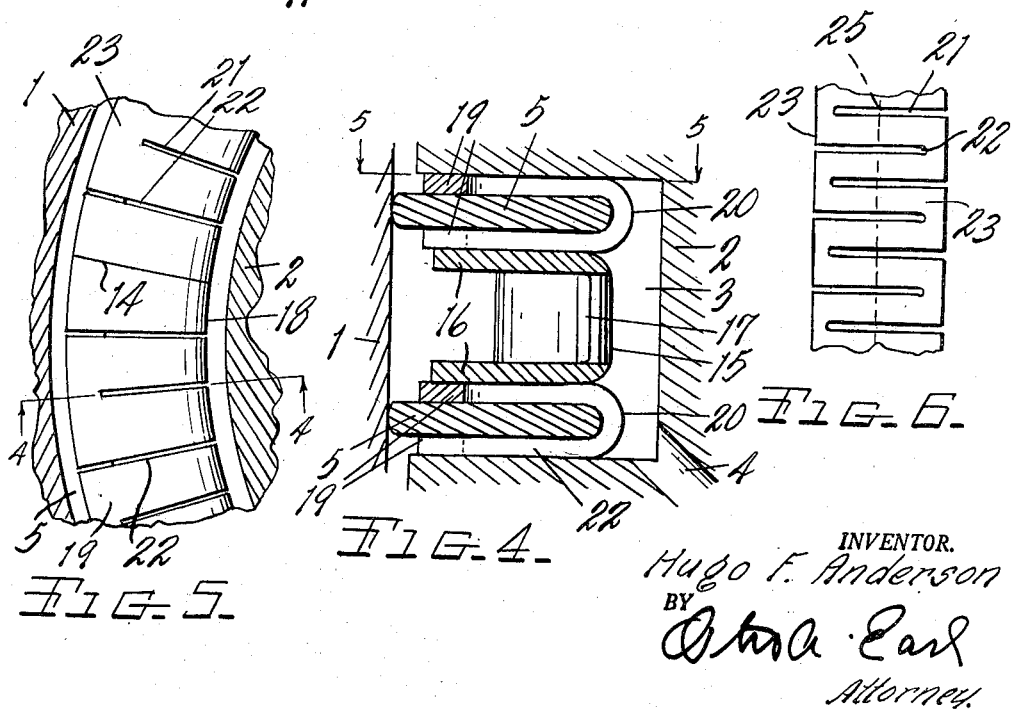

2,776,865

PISTON RING ASSEMBLY AND ELEMENTS THEREOF

Hugo F. Anderson, Hastings, Mich., assignor to Hastings Manufacturing Company, Hastings, Mich.

Application August 11, 1953, Serial No. 373,565

3 Claims. (Cl. 309—24)

This invention relates to a piston ring assembly and elements thereof.

The main objects of this invention are:

First, to provide a piston ring assembly which is adapted for installation in piston ring grooves of varying depths and one in which the cylinder wall engaging elements are subjected to substantially uniform springable radial thrust throughout.

Second, to provide a piston ring assembly in which the parts are formed of ductile metal stock and one which can be easily installed with little likelihood of injuring the parts during installation.

Third, to provide an expander member for piston rings which may be formed of thin ductile ribbon stock and at the same time is capable of exerting the desired radial thrust on the piston ring element supported thereby.

Objects relating to details and economies of the invention will appear from the description to follow. The invention is defined and pointed out in the claims.

A preferred embodiment of the invention is illustrated in the accompanying drawing, in which:

Fig. 1 is a fragmentary longitudinal section of a cylinder and associated piston with the ring assembly of my invention installed therein. The piston and cylinder being shown conventionally and without regard to relative dimensions and clearances.

Fig. 2 is a fragmentary view in section on a line corresponding to line 2—2 of Fig. 1, parts being broken away to show structural details.

Fig. 3 is a perspective view of one of the expander members of the embodiment of my invention shown in Figs. 1 and 2.

Fig. 4 is a fragmentary longitudinal section corresponding to that of Fig. 1 of a modified form or embodiment of my invention on a line corresponding to line 4—4 of Fig. 5.

Fig. 5 is a fragmentary view on a line corresponding to line 5—5 of Fig. 4.

Fig. 6 is a fragmentary plan view of a partially formed expander member of the embodiment of Figs. 4 and 5.

In the accompanying drawing 1 represents a cylinder of an internal combustion engine and 2 a piston having a piston ring groove 3 therein. The groove illustrated is adapted to receive an oil ring and is provided with drain openings 4. It will be understood that the parts are shown greatly enlarged as compared to the commercial structure, and without regard to clearances and tolerances.

The piston ring assembly of the embodiment of my invention shown in Figs. 1, 2 and 3 comprising cylinder wall engaging elements or rails 5 as they are sometimes designated, which are disposed in axially spaced relation and in supported engagement with the side walls of the piston ring groove. These rails 5 are desirably formed of ribbon steel coiled edgewise and are split at 6 and are radially expansible.

Each piston ring element is provided with an individual expander 7 which is desirably likewise formed of ribbon steel coiled edgewise and having an outwardly and axially disposed flange 8 at the inner edge thereof providing a radial thrust abutment 9 for the rail 5 when the expander member is disposed in side by side relation to the rail with the rail 5 between the expander member and the adjacent side wall of the groove.

The expander members 7 have a plurality of angularly spaced radial slots 10 extending radially outwardly from their inner edges and a plurality of slots 11 extending radially inward from their outward edges. These slots 10 and 11 are disposed in angularly spaced overlapping relation to provide annular inner and outer series of springable elements 12 and 13.

When the expander and its associated cylinder wall engaging member is installed in a piston ring groove the ends 14 of the expander member are disposed in end abutting relation with the expander member under circumferential springable stress and the cylinder wall engaging member is springably urged radially outward. These units comprising a cylinder wall engaging member and its coacting expander member are axially spaced by a spacer designated generally by the numeral 15 and which is generally of outwardly facing channel shape and comprises side members or flanges 16 with portions 17 of the web struck outwardly and conformed to axially support the flanges or side portion 16 of the spacer. This permits the spacer to be made of very light stock. However, it is desired to point out that other spacers, such for example as illustrated in the Phillips Patent No. 2,466,474, are suitable for use in this assembly. This assembly is well adapted for use in piston ring grooves of varying depth.

In the embodiment of my invention shown in Figs. 4, 5 and 6 the expander members 18 are desirably of flattened U-shape or section and are desirably formed of ductile ribbon metal folded upon itself. In this embodiment the piston ring element 5 is disposed between the side or flanges 19 of the expander member in radially supported relation to the bight 20 thereof. The expander member has a series of angularly spaced slots 21 and 22 disposed radially through the bight thereof and extending into its flanges or sides, alternating slots in each flange opening at the edges thereof with the result that each flange has a plurality of springable elements 23. The same type of spacer 15 is illustrated in this embodiment. These expander members support the cylinder wall engaging members or rails 5 against axial thrust and prevent substantial tilting, supporting them against torsional or dishing twist even when formed of very light stock.

As stated, I have not attempted to illustrate the parts in their proper relation as to thickness or other dimensions, or to illustrate clearances or tolerances. The cylinder wall engaging elements or rails 5 may desirably be formed of stock of the order of .015 to .030 thickness and the expander members may be of stock of the same order in thickness although satisfactory results may be had with stock of the order of .015 to .024. As previously stated, the cylinder wall engaging elements, the expander members and the spacer members are desirably formed of ductile metal.

In Fig. 6 I illustrate the preliminary steps in forming the expander members of Figs. 4 and 5 which are the forming of the slots 21 and 22 with the strip in the flat and then folding it into channel or U-shape on the line indicated at 25.

I have illustrated and described my invention in two highly practical embodiments. I have not attempted to illustrate or describe other embodiments or adaptations as it is believed this disclosure will enable the adaptation of the invention as may be desired.

Having thus described my invention what I claim as new and desire to secure by Letters Patent is:

1. A piston ring assembly comprising axially spaced annular split cylinder wall engaging elements formed of ribbon steel coiled edgewise, annular split expander members of outwardly facing channel section having parallel flanges between which the cylinder wall engaging elements are disposed in supported relation to the bights of said expander members, said expander members having angularly spaced slots extending through the bights thereof and opening alternately at outer edges of the flanges and providing an annular series of circumferentially springable elements when the assembly is installed in a piston ring groove with the ends of the expander members in abutting relation and with the expanders under circumferentially springable stress, and a spacer disposed between the expander members in side by side axial thrust supporting relation thereto, the expander members being free for independent radial movement and spring action independently of the spacer.

2. A piston ring assembly comprising axially spaced annular split cylinder wall engaging elements, annular split expander members of outwardly facing channel section in which the cylinder wall engaging elements are disposed in supported relation to the sides and bights of said expander members, said expander members having angularly spaced slots extending through the bights thereof and opening alternately at the outer edges of the flanges and providing an annular series of circumferentially springable elements when the assembly is installed in a piston ring groove with the ends of the expander members in abutting relation and with the expander under springable stress, and a spacer disposed between the expander members in axial thrust supporting relation thereto, the expander members being free for independent radial movement and spring action independently of the spacer.

3. A piston ring unit comprising a thin split springably resilient cylinder wall engaging member formed of ribbon steel coiled edgewise and having flat sides, and an annular split expander member of outwardly facing channel section having parallel flanges having flat inner sides between which said cylinder wall engaging element is disposed for axial thrust supported engagement therewith and for radial thrust supported engagement with the bight thereof, said expander member flanges and the bight thereof being of uniform thickness and having angularly spaced slots extending through the bight thereof and opening alternately at the outer edges of the flanges providing an annular series of circumferentially springable elements when the assembly is installed in a piston ring groove with the ends of the expander member in abutting relation and with the expander under circumferential springable stress, the cylinder wall engaging element being otherwise free for radial and circumferential movement relative to the expander member.

References Cited in the file of this patent

UNITED STATES PATENTS

| | | |
|---|---|---|
| 2,330,550 | Bowers | Sept. 28, 1943 |
| 2,660,494 | Olsen | Nov. 24, 1953 |
| 2,663,602 | Olsen | Dec. 22, 1953 |
| 2,670,256 | Hsia-si Pien | Feb. 23, 1954 |

FOREIGN PATENTS

| | | |
|---|---|---|
| 104,398 | Sweden | Apr. 28, 1942 |